UNITED STATES PATENT OFFICE.

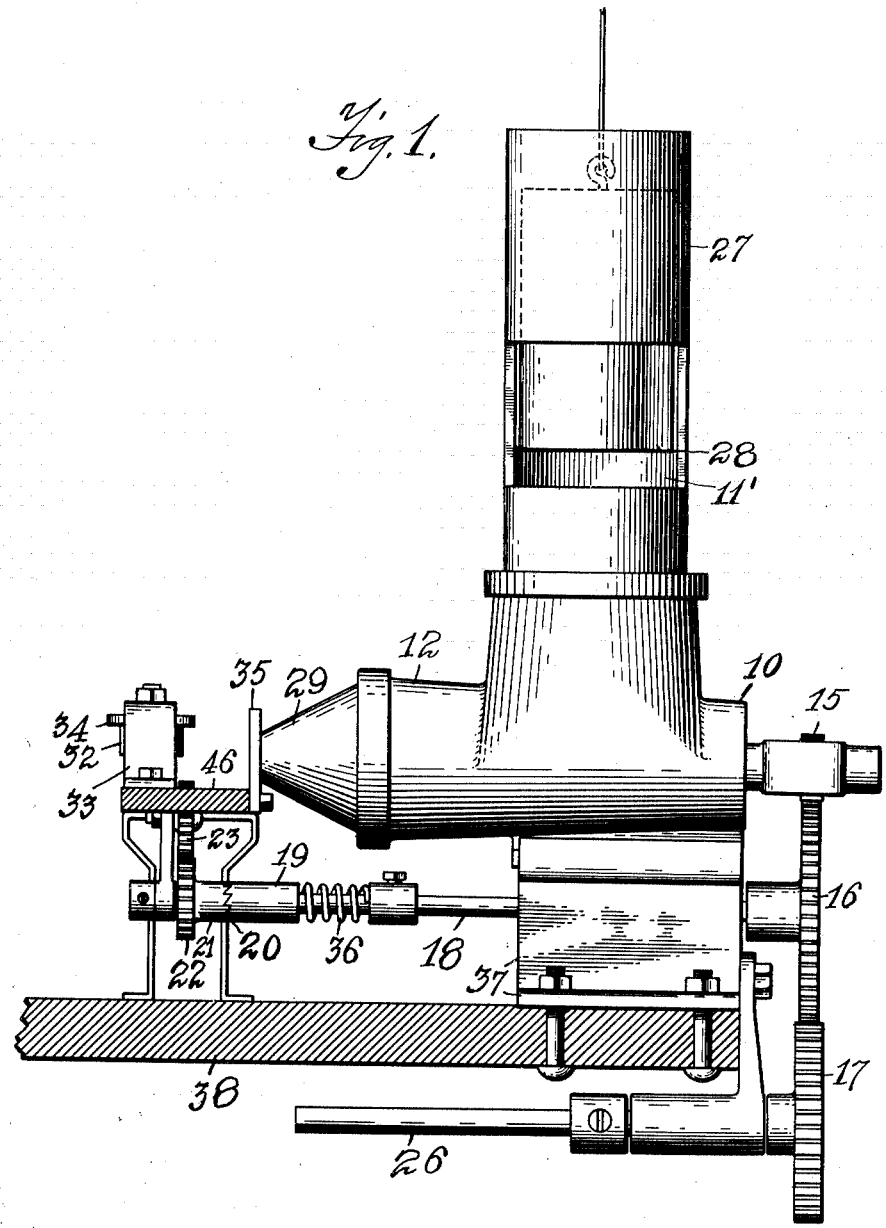

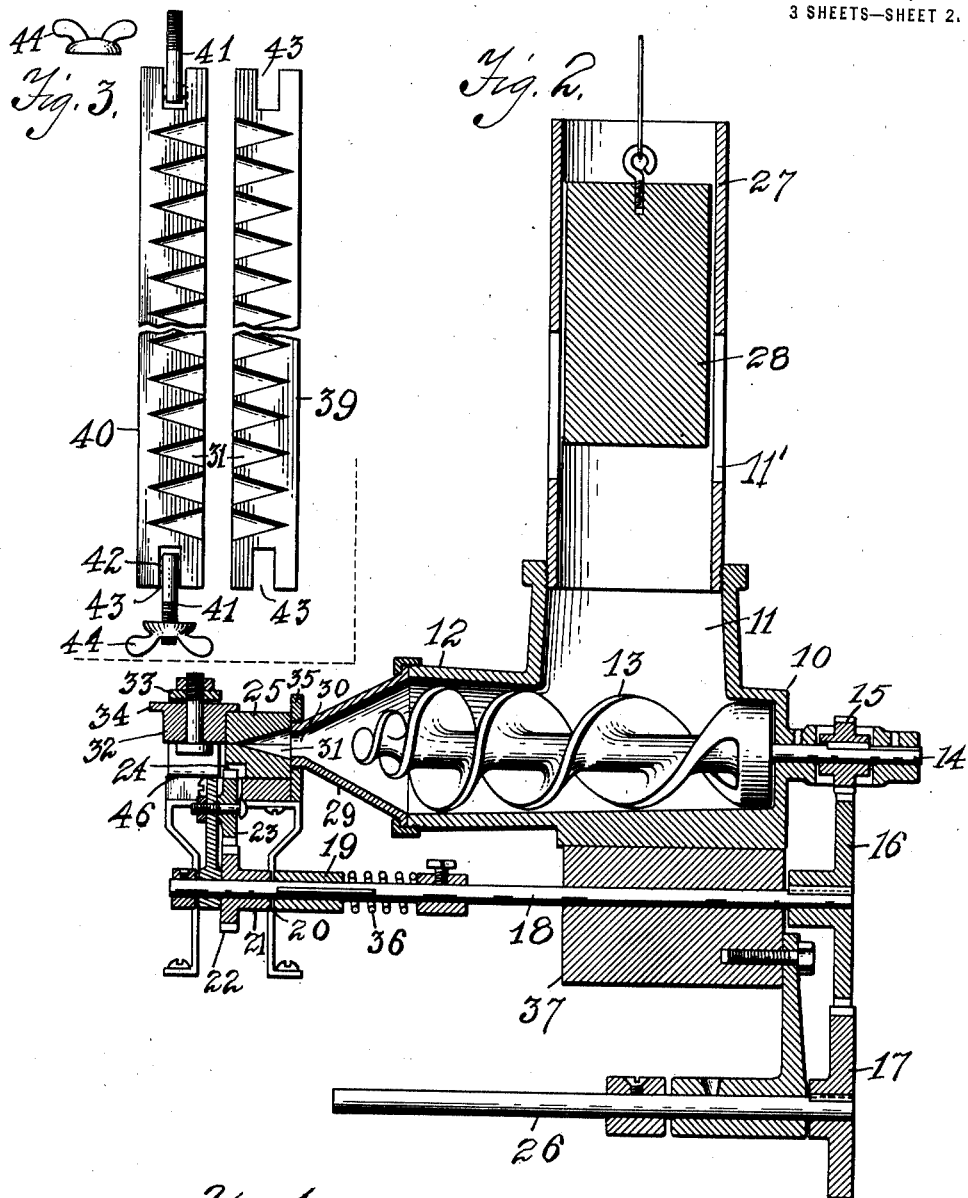

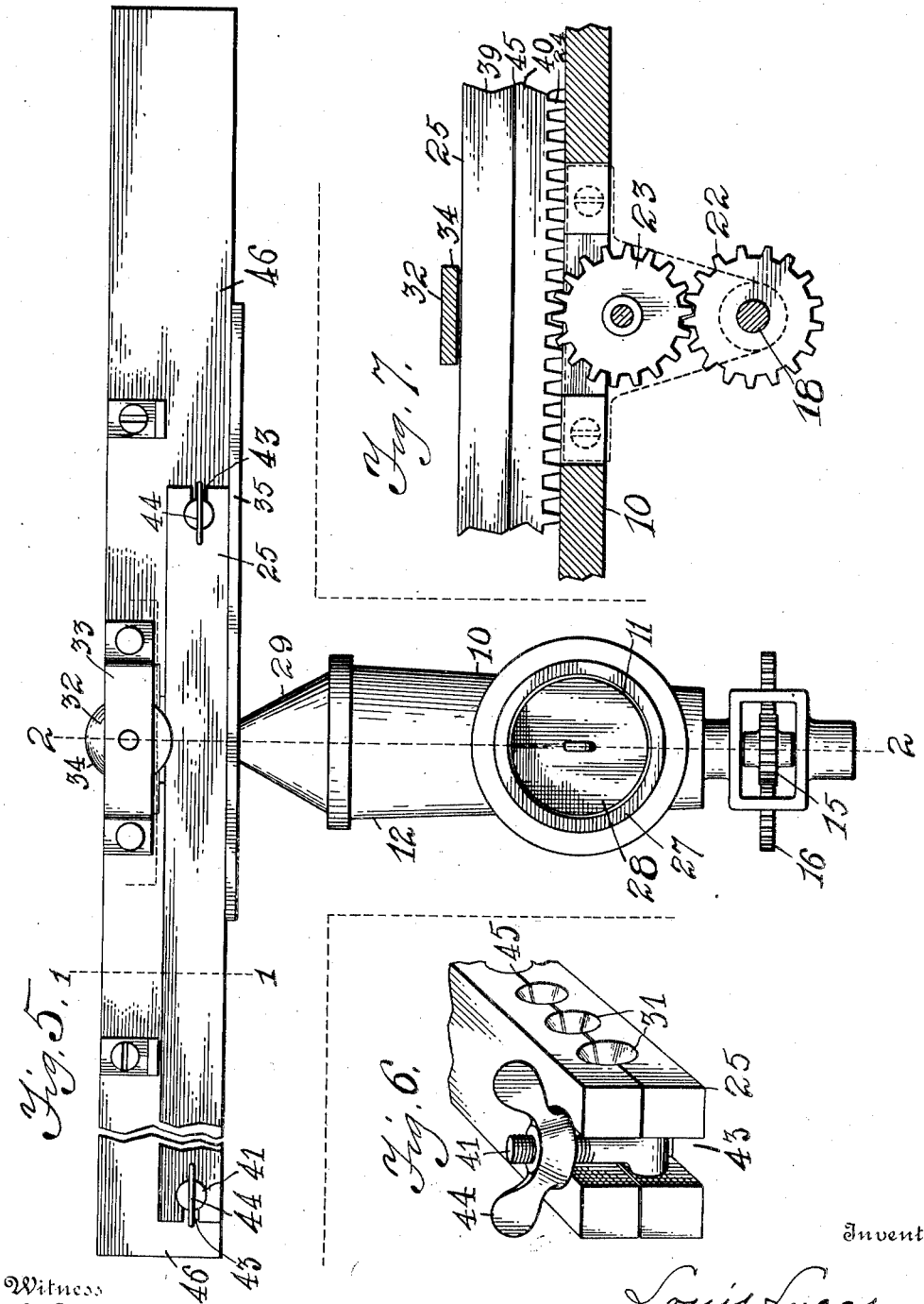

LOUIS LUCAS, OF JAMESTOWN, NEW YORK.

CONE-MOLDING MACHINE.

1,367,196.

Specification of Letters Patent. Patented Feb. 1, 1921.

Application filed March 2, 1920. Serial No. 362,698.

*To all whom it may concern:*

Be it known that I, LOUIS LUCAS, a citizen of the United States, residing at the city of Jamestown, in the county of Chautauqua and State of New York, have invented certain new and useful Improvements in Cone-Molding Machines, of which the following, taken in connection with the accompanying drawings, is a specification.

The invention relates to machines for molding or shaping plastic materials, as for example incense cones; and the object of the improvement is to provide a machine whereby the plastic material is forced into molds which are here shown as cone shaped, though they might be other designs according to the shape of the mold into which said plastic material is pressed, said molds being made in series, means being provided for moving the same at such a rate of speed that the molds are filled by means of a compression feed, which is here shown as a weight and screw feed, the same being shown as actuated by power, though it might be manually operated without departing from my invention; and the invention consists in the novel features and combinations hereinafter set forth and claimed.

In the drawings, Figure 1 is an elevation of the feeding or filling portion of the molding machine, the track for the mold being shown in section at line 1—1 in Fig. 5. Fig. 2 is a vertical sectional view of said machine at line 2—2 in Fig. 5 showing the construction and arrangement of the same with the compound molding bar in position for filling. Fig. 3 is a plan view of the inner sides of the two parts of the molding bar, the central portion being broken away and showing the clamping screws for said molding bar parts. Fig. 4 is a plan view of the toothed lower side of the lower portion of the molding bar. Fig. 5 is a top plan view of the entire machine with the molding bar in position for filling as it is moved along its track by means of the actuating gears. Fig. 6 is a perspective view of an end portion of said molding bar. Fig. 7 is a sectional view of the track showing a portion of the molding bar and the driving gears for said molding bar meshing in the toothed lower side.

Like characters of reference refer to corresponding parts in the several views.

The numeral 10 designates the casing for the compression or filling portion of the machine which has the tubular opening 11 leading to the cylindrical portion 12 within which the screw 13 is revolubly mounted on the shaft 14.

The shaft 14 supports the upper gear 15 of the gear train 15, 16 and 17, the middle gear 16 being mounted on the shaft 18 which has a spring dental clutch 19 having teeth 20 and the part 21 extending out in a driving gear 22 which drives the gear 23. The gear 23 intermeshes in the toothed rack 24 on the under side of the lower portion of the molding bar 25. The gear 17 is mounted on a shaft 26 connecting to the power by a pulley or gear as may be most convenient.

The opening 11 is extended up in the tube 27, which has the weighted compressor 28 suspended therein so that said weight presses the plastic material down through the feeding opening 11' onto the screw 13 and said screw presses said material through the tapered end 29 of the cylinder 12. Said tapered end 29 has the opening 30 therein which is preferably a little less in diameter than the larger end of the cone shaped opening 31 in the molding bar 25. The molding bar 25 is firmly pressed against the mouth or opening 30 of the cylinder 12 by means of the roller 32, which is rotatively mounted in the frame 33, and has the flanged upper end 34 which holds the edge of the bar 25 firmly in place and up the propelling gear 23, the opposite side of the molding bar 25 being pressed against the vertical side plate 35.

The dental clutch 19 has the saw or ratchet teeth 20 which face in one direction so that the molding bar 25 can be manually moved forward upon its track 46, the gears 22 and 23 and the spring 36 for said clutch 19 permitting such a forward movement. Thus if for any reason the plastic material is not filling the mold as it should, or for some reason it is desired to move the molding bar 25 forward, it can be instantly accomplished.

The cylinder 12 and frame of the machine are mounted upon a suitable pedestal 37 which is securely attached to a supporting bench or table 38. The molding bar 25 is made in two parts 39 and 40 and has the wise pins 42 in the slots 43 in the ends of the lower portion 40, the slots 43 extending up through the end of the upper portion 39. A series of molding openings 31 which are here shown cone-shaped are provided in the adjacent edges of the parts 39 and 40 so that said openings register with one another. forming molding openings for the plastic material along the side of the molding bar 25 adjacent to the mouth 30 in the tapered end 29 of the cylinder 12.

The screws 41 at each end have the thumb nuts 44 so that they can be quickly and easily released and dropped downward as shown in dotted outline, and the molded plastic material can be removed from the molding bar 25 by raising the top bar 39 from the lower bar 40 and tipping said plastic molded forms from the lower bar 40. The molding bar 25 may be of any desired length. If made too long, they are unwieldly to handle and would necessitate additional holding screws 41 since the joint 45 must be so tightly closed by clamping the part 39 on the part 40 that the plastic material cannot be forced into the same. In order that the plastic material may freely leave the mold, the molding bar 25 is preferably made of a metal that takes a high polish and wears bright, as for example copper, bronze, or some equally good material.

In operating the machine, the plastic material is fed into the tube 27 and forced downward by means of the weight 28 upon the screw 13 and is pressed by said screw through the orifice or mouth 30 into the mold 31. The train of gears 15, 16, 17 which turns the feeding screw 13 also turns the shaft 18 and through the gears 22 and 23 propels the molding bar 25 along its track, thereby receiving in the molding openings 31 a perfect filling of the plastic material so that the machine can be stopped and the molding bar 25 raised from its track 46 as it passes out from underneath the flanged roller 34 and opened by loosening the nuts 44 at each end and swinging the screws 41 downward emptying the plastic cones therefrom after which said molding bar is ready for refilling.

I claim as new:—

1. In combination with filling mechanism for plastic material, a molding bar made in two parts having a series of molding opening partly in each of the adjacent sides thereof, means for attaching the two parts of said molding bar to one another, and means propelling said bar along a prepared track.

2. In combination with filling mechanism for plastic material, a molding bar comprising two parts having a series of molding openings in the side thereof partly in each of said parts, said parts having slotted ends, screws bolts pivotally attached within the slotted ends of the under part and having thumb nuts for manually clamping said parts to one another, rack teeth on the under side of the under part, a train of gears to propel said molding bar, and a spring clutch connected to one of said gears permitting movement of said molding bar when desired in one direction.

3. In a machine for molding plastic materials, a cylinder having a contracted mouth at one end, a screw rotatably mounted within said cylinder to press the plastic material through said contracted mouth, a feeding opening to said cylinder for said plastic material having a weight therein to press said plastic material downward into said cylinder and assist said screw, a track across said contracted mouth of said cylinder, a molding bar fitting on said track and having a series of molding openings in the side thereof conformably feeding from said contracted mouth, means for pressing said molding bar against said contracted mouth, gearing to propel said molding bar across said contracted mouth to fill said molding openings with the plastic material, and a ratchet clutch on said gearing permitting the manual movement of said molding bar in one direction.

4. In a plastic molding machine, a filling mechanism having a cylinder having a horizontal discharge, a vertically disposed guide member having an opening in register with the discharge and extending on opposite sides of the cylinder, a frame having a horizontal part, a mold slidable on said frame part and against said guide member to receive material from the cylinder, means engaging the opposite side of the mold to hold same against said frame part and the guide member, and means to slide mold.

5. In a plastic molding machine, a filling mechanism having a cylinder with a horizontal discharge, a vertically disposed guide member having an opening in register with the discharge and extending on opposite sides of the cylinder, a frame having a horizontal part, a mold slidable on said frame part and against said guide member to receive material from the cylinder, a roller on the frame bearing against the opposite side of the mold to hold same against the guide member, said roller having a flange engaging on top of the mold to hold the latter against said frame part, and means to actuate the mold.

6. In combination with a filling mechanism having a discharge, a two-part mold having spaced openings, the latter formed in each of the mold parts and being complementary, means to support the mold for sliding past the discharge and with its openings in a position to successively register with the discharge, and means to slide the mold.

7. In combination with a filling mechanism having a discharge, a mold slidable past the discharge and formed to receive material from the discharge, mechanical means to actuate the mold, and means to allow of manual movement at will of the mold in one direction.

8. In combination with a filling mechanism having a discharge, a two-part mold having spaced openings, the latter formed in each of the mold parts and being complementary, means to support the mold for sliding past the discharge and with its openings in a position to successively register with the discharge, means acting on the mold to hold the parts against separating movement, and means to actuate the mold.

9. In combination with a filling mechanism having a discharge, a mold slidable past the discharge and formed to receive material from the discharge, and mechanical means to actuate the mold including a ratchet clutch the teeth of which are formed to allow of manual movement at will of the mold in one direction.

10. In combination with a horizontal cylinder having a feed device therein and a horizontal discharge at one end of the feed device, a tubular member extending vertically and upwardly from the cylinder, a weight slidable in the tubular member to force the material downwardly against the feed device, a mold slidable past the discharge to receive materal therefrom, and means to actuate the mold.

11. In combination with a horizontal cylinder having a feed device therein and a horizontal discharge at one end of the feed device, a tubular member extending vertically and upwardly from the cylinder, means in the tubular member to force the material downwardly against the feed device, a mold slidable past the discharge to receive material therefrom, and means to actuate the mold.

In testimony whereof I have affixed my signature in the presence of two witnesses.

LOUIS LUCAS.

Witnesses:
C. V. SWANSON,
A. W. KETTLE.